United States Patent
Penmatsa et al.

(10) Patent No.: US 9,737,811 B1
(45) Date of Patent: Aug. 22, 2017

(54) THREE DIMENSIONAL TERRAIN MODELING

(71) Applicant: Amazon Technologies, Inc., Seattle, WA (US)

(72) Inventors: Rajeev Varma Penmatsa, Lake Forest, CA (US); Jordan Ross Lehmiller, San Marcos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 279 days.

(21) Appl. No.: 14/636,724

(22) Filed: Mar. 3, 2015

(51) Int. Cl.
*G07F 17/00* (2006.01)
*A63F 13/52* (2014.01)
*A63F 13/57* (2014.01)

(52) U.S. Cl.
CPC .............. *A63F 13/52* (2014.09); *A63F 13/57* (2014.09)

(58) Field of Classification Search
CPC ........... A63F 13/52; A63F 13/57; G06T 17/05
See application file for complete search history.

(56) References Cited

U.S. PATENT DOCUMENTS

| | | | |
|---|---|---|---|
| 2004/0017385 A1 | 1/2004 | Cosman et al. | |
| 2011/0227918 A1* | 9/2011 | Takahashi | A63F 13/10 345/426 |
| 2013/0187914 A1* | 7/2013 | Kozlov | G06T 17/05 345/420 |
| 2015/0348284 A1* | 12/2015 | Bradbury | G06T 15/04 345/419 |

OTHER PUBLICATIONS

Boggus; "Modeling, Evaluation, Editing, and Illumination of Three Dimensional Mazes and Caves for Computer Games"; The Ohio State University; Dissertation; 2012; 194 pages.

* cited by examiner

*Primary Examiner* — Dmitry Suhol
*Assistant Examiner* — Carl V Larsen
(74) *Attorney, Agent, or Firm* — Baker & Hostetler LLP

(57) ABSTRACT

Techniques for simulating destruction in a simulated space, for example, terrain, are disclosed herein. In some cases, one or more textures may be associated with an area of a simulated space, which may include a three dimensional space. A destructibility value, which may indicate the area's resilience to destruction or strength, may be associated with the area of simulated space. One or more textures of the simulated space may be changed or updated based on the occurrence of a destruction causing event. The change in one or more textures of the simulated space may be determined based at least in part on an intensity associated with the destruction causing event and the destructibility value of the affected simulated area.

20 Claims, 12 Drawing Sheets

THREE DIMENSIONAL TERRAIN MODELING

CROSS-REFERENCE TO RELATED APPLICATIONS

This application is related to the following application, which is hereby incorporated by reference in its entirety: U.S. patent application Ser. No. 14/636,655 filed Mar. 3, 2015, entitled "THREE DIMENSIONAL TERRAIN MODELING".

BACKGROUND

Content items such as video and video games are becoming increasingly widespread and popular. Such content items may include graphic representations of terrain, for example in three dimensions. In some cases, the terrain may include various natural features, for example, rock, sand, soil, water, trees, plants, etc., and/or man-made features including buildings or other structures made of concrete, wood, glass, and so on. In some cases, large amounts of memory and/or processing capabilities may be required to model detailed terrain to provide an enhanced user experience.

Additionally or alternatively, memory and processing capabilities may also limit the ability to model and update changeable terrain, such as destructible terrain, using current techniques in real-time. For example, modeling various layers of terrain that may, in real life, respond differently to different events, such as explosions or other destruction-type events, may require processing large amounts of data.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
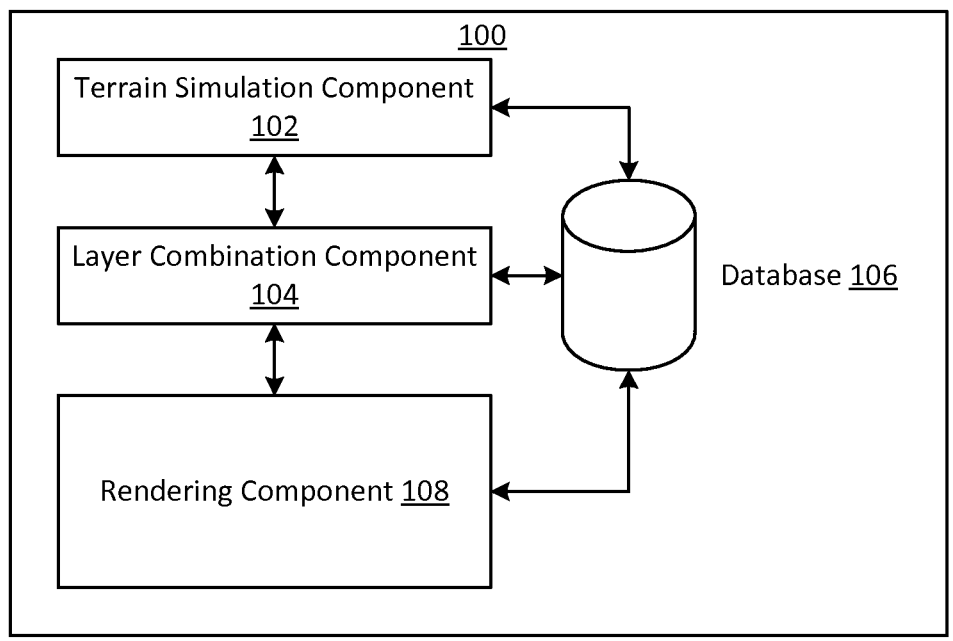
FIG. 1 is a diagram illustrating an example computing node for simulating three-dimensional space in accordance with the present disclosure.

Techniques for modeling or simulating three-dimensional graphics information are described herein. In one aspect, a three dimensional volume represented by graphics information, for example, corresponding to terrain, may be identified. A two dimensional area, including first and second dimensions, corresponding to three dimensional volume may be determined. In some cases, the three dimensional volume may be represented by one or more voxels. A plurality of layers, each including a third dimension value (e.g., height), and at least one layer characteristic, may be associated with the two dimensional area. In some cases, the at least one layer characteristic may include material or composition, e.g., rock, sand, concrete, free space, etc., opacity, density, or various other properties or textures of the layer corresponding to the two dimensional area. Two or more layers, (e.g., a subset of layers) having at a similar layer characteristic may be combined, for example into a combined layer associated with the two dimensional area. In some aspects, run length encoding may be used to combine multiple layers having a similar layer characteristic. The combined layer information associated with the two dimensional area may then be stored, for example, to be used to render the terrain corresponding to the two dimensional area, for example to one or more users.

In one aspect, multiple three dimensional volumes or voxels may be represented by and corresponded to multiple two dimensional areas, each with associated layer/combined layer information. In some cases, in the process of combining multiple layers, the third dimensional values of each layer may be associated with the combined layer, for example representing a combined third dimension of some or all of the combined layers.

In some cases, an event may occur that affects or causes a change to a one or more layers of a two dimensional area. In this scenario, the association between affected layer(s)/affected combined layer(s) may be updated to reflect a change in the two dimensional area. In one example, the event may include a destruction event, such as an explosion, weapons fire in a video game, etc. In some cases, each layer/combined layer may be associated with a strength or destructibility value, and the destruction event may be associated with a degree of impact or intensity. A change in one or more layers may be proportional or based on the destructibility value of the one or more affected layers of the two dimensional area and the degree of impact of the event itself.

Using the described techniques, one or more three dimensional volumes, such as one or more portions of terrain, may be more effectively and efficiently modeled/simulated. By combining layers having one or more similar layer characteristics, the computation and memory involved in rendering and updating three dimensional simulations may be reduced.

Another aspect of the described techniques includes simulating destruction, for example, of a simulated space, such as terrain. In one example, one or more textures and a destructibility value may be associated with an area of simulated space, such as an area of terrain. The one or more textures may include, for example, any of composition, material, surface properties, opacity, and other features of the simulated space or terrain. In some cases, the destructibility value may be preconfigured for an area of terrain, for example, based on the type or composition of the terrain. Upon the occurrence of a destruction causing event, e.g., an explosion, weapons fire including grenades, missiles, etc., one or more of the textures associated with the affected terrain may be changed. In some cases, the change of one or more textures may be based, at least in part, on an intensity associated with the destruction causing event. In some examples, the change of one or more textures of the terrain may be based, at least in part, on the destructibility value associated with the terrain. Upon occurrence of a destruction causing event, the destructibility value of the affected terrain may be changed, such as to reflect or represent a decrease in strength of that terrain. As stated above, it should be appreciated that terrain may include or refer to natural features and man-made features alike, such as grass, rock, sand, buildings, structures, and so on. Upon changing one or more textures of an area of terrain, the updated graphic information may then be rendered and presented to a user, for example, of a video game including the rendered graphics.

In some aspects, the destruction causing event may affect multiple areas of terrain. In one such example, the destructibility values of the affected areas of terrain may be averaged. One or more textures of the affected areas of terrain may be changed, for example, based on an intensity of the destruction causing event and the average destructibility value of the affected areas of terrain. In another example, the intensity of the destruction causing event may be mapped to the multiple areas of terrain, for example based on the relative distance between each affected area and the center associated with the destruction causing event. One or more textures of the affected areas of terrain may then be changed according to or based on the mapped intensity of the destruction causing event and the destructibility values of each area of terrain. In this way, processing and memory requirements for simulating destructible terrain may be reduced and/or simplified.

In other example, an area affected by a destruction causing event may be sub-divided into multiple sub-areas, for example, such that one or more textures of one or more sub-areas may be changed relative to other sub-areas, to display a higher level of detail as a result of the destruction causing event.

As set forth above, in accordance with the disclosed techniques, three-dimensional space and/or destruction may be simulated. FIG. 1 is a diagram illustrating an example of a computing node 100 configured for simulating a three dimensional space or volume. In the example shown, computing node 100 may include a terrain simulation component 102, a layer combination component 104 and a rendering component 108, all of which components may be in communication with one or more databases 106.

The computing node 100 may include one or more aspects of computing device 1000 described below in reference to FIGS. 10 and 11. In some cases, computing node 100 may be part of or executable on computing device 1000. For instance, program instructions to perform some or all of the functionality of computing node 100 may be stored as code 1104 and/or data 1106 of memory 1102 executable by one or more processors 1100 of computing device 1000. In other cases, the components of computing node 100 may be located across multiple devices and or servers, for example described in reference to FIG. 10.

In example embodiments, the terrain simulation component 102 may receive or obtain graphics information associated with a three dimensional space or volume. In some cases, the graphics information may be received from one or more sources of graphic information, for example associated with a particular simulation, video game, etc. In some cases, the graphics information may be received from a graphical editing tool, for example in the form of authored three dimensional textures. The graphics information may be associated with a portion or space defining terrain, for example, such as natural terrain including rocks, grass, dirt or soil, sand, water, etc., or man-made terrain, such as buildings, or other structures. In a particular example, the graphics information may be in the form of or associated with one or more voxels that define the properties of a space relative to a single point. In some cases, the terrain simulation component 102 may convert received graphics information, such as in other forms, to be represented by voxels.

In some cases, the graphics information may be associated with video (e.g., streaming video or video executed on the computing node 100 or on computing system 100 co-located with computing node 100). In other cases, the graphics information may include or be associated with played content such as a video game. In the video game context, the terrain simulation component 102 may receive some of the graphics information from a user, for example from one or more input devices, including touchscreens, gesture recognition components, controllers, keyboard, mouse, microphone and many others. The terrain simulation component 102, the layer combination component 104, the rendering component 108, and the databases 106 may process the received graphics information and generate image data. Rendering component 108 may then render the image data for transmission and presentation to user via one or more output devices, such as a display device, speakers, etc. (not shown).

Upon receiving or obtaining the graphics information, the terrain simulation component 102 may determine a two dimensional space or area, for example, representing an area of terrain, that corresponds to the three dimensional volume. The two dimensional area may be defined by a first and second dimension, for example, width and length. Based on information of the properties or textures associated with the three dimensional space, the terrain simulation component 102 may define or associate one or more layers with the two dimensional area. Each layer may include a third dimension value (e.g., height), and one or more layer characteristics. The one or more layer characteristics may include a variety of information, such as material or composition, density, opacity, color, surface texture, strength, and so on. In some examples, each layer may be associated with a type or composition of a substance, such as rock, grass, sand, soil, concrete, free space, and so forth, with corresponding properties or textures.

In some cases, the terrain simulation component 102 may communicate the two dimensional area information (e.g., width and length), and associated layer information (e.g., height, and one or more layer characteristics), for each layer associated with the two dimensional area to the layer combination component 104. In other cases, the terrain simulation component 102 may store the two dimensional area information and associated layer information for each layer associated with the two dimensional area in the database 106. The layer combination component 104 may access the database 106 and retrieve the layer information associated with the two dimensional area.

The layer combination component 104 may then compare one or more layer characteristics of each layer associated with the two dimensional area. If at least one of the layer characteristics of multiple layers associated with the two dimensional area are the same, or in some cases, similar, the layer combination component 104 may combine the layers having similar or the same characteristics into one or more combined layers. The layer combination component 104 may then store the combined layer information and associate the information with the two dimensional area in the database 106. The rendering component 108 may, in some cases, access the database 106, retrieve the two dimensional are information and the layer/combined layer information, and render the associated graphics (e.g., terrain model) into image data to be provided to a user, for example via one or more presentation devices (e.g., displays, monitors, etc.). In some cases, the layer combination component 104 may communicate some or all of the combined layer information and/or associated two dimensional area directly to the rendering component 108. Using the two dimensional area information and layer/combined layer information, the rendering component 108 may then render the graphics information (e.g., of the three dimensional volume) to a user. In other cases, the layer combination component 104 may communicate some of the two dimensional area information and/or the layer information to the rendering component 108, and the rendering component 108 may access the remaining information via database 106.

In some cases, combining multiple layers into a combined layer may include associating a number of layers to the combined layer and/or associating a combined third dimensional value to the combined layer based on the third dimension values of each layer to be combined. In some cases, the combined third dimensional value (e.g., height), may be the sum of third dimensional values for each of the layers in the combined layer, such that multiple layers are reduced or compressed to a single combined layer, having the common properties of the individual layers and having a third dimension value (e.g., height) of the combination of each of the layers. In some implementations, the layer combination component 104 may select only layers that are adjacent to one another for combining. Multiple different sets or subsets of layers may be combined, for example, where each subset has a different common or similar characteristic, where there are multiple subsets of adjacent layers having a common characteristic, and so on.

The multiple layers having similar or the same characteristic(s) (e.g., composed of the same material) may be combined in other multiple different ways or according to various techniques. For example, in some cases, multiple layers may be combined using run length encoding, or other encoding techniques. In the run length encoding example, the layer information may include the type of material of a layer, followed by the number of layers also composed of the same material. For example, 20 layers of the same composition would be reduced to the composition, followed by the number 20. This may reduce the amount of memory required to store the layer information, such that only one set of the information associated with a particular layer is stored in memory, and then accessed 20 times, rather than 20 sets of the full composition information being stored. The process of combining multiple layers and storing information related to multiple layers will be described in greater in reference to FIGS. 4, 5, and 8 below.

It should be appreciated that other combination or compression techniques may be used to reduce the amount of information stored for each layer of a particular two dimensional area and are contemplated herein.

The functionality of compute node 100 has been described above in reference to one three dimensional volume. It should be appreciated that the components of compute node 100 may implement the above-described functionality with multiple three dimensional volumes (e.g., voxels), to render simulations including a plurality of three dimensional volumes, such as terrain in a scene of a video game.

In this way, complex three dimensional data structures representing three dimensional volumes may be simplified and/or represented by two dimensional data structures associated with third dimension characteristics. In some cases, storing the graphics information in this way may reduce the memory required to store and render the graphics information into image data.

In some cases one or more of the above steps may be performed by one or more graphics processing units (GPU's) associated with the terrain simulation component 102.

Figure 2:
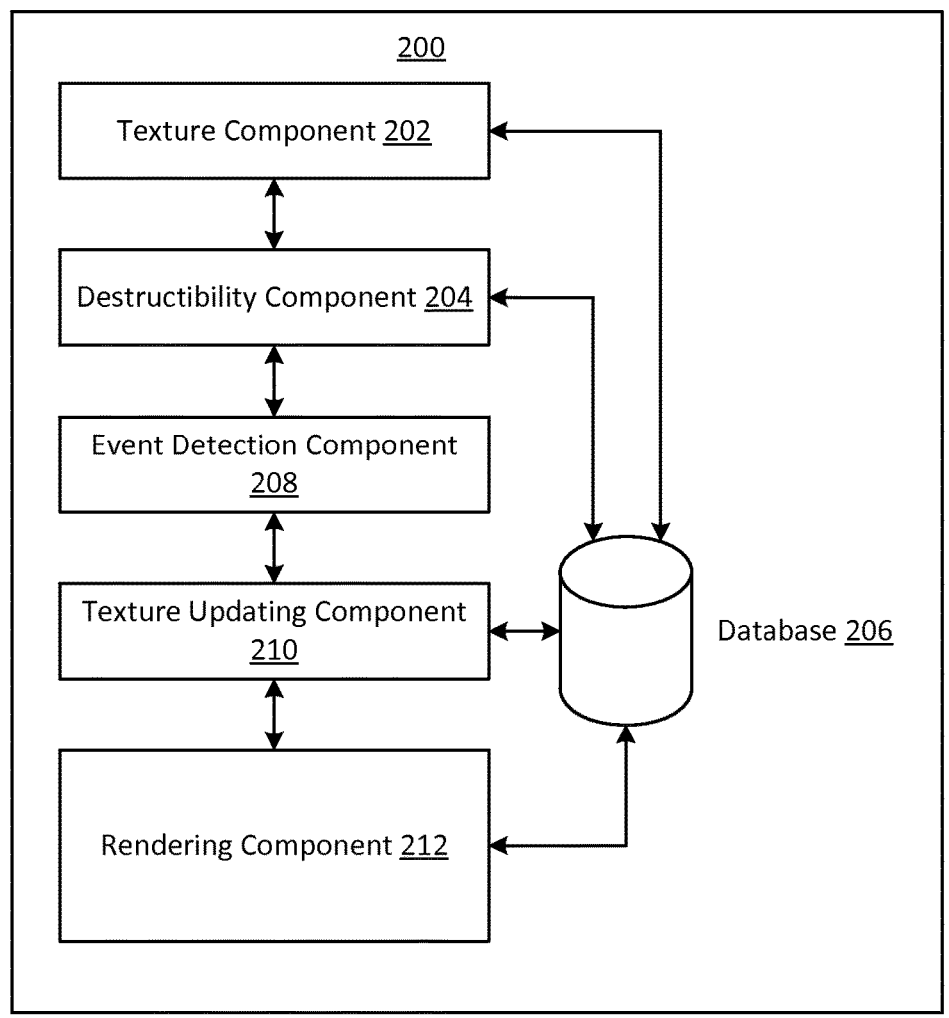
FIG. 2 is a diagram illustrating an example computing node for simulating destruction in accordance with the present disclosure.

With reference to FIG. 2, an example of a computing node 200 configured to simulate destruction is shown. Example computing node 200 may include a texture component 202, a destructibility component 204, an event detection component 208, a texture updating component 210, and a rendering component 212, all of which may be in communication with a database 206.

The computing node 200 may include one or more aspects of computing device 1000 described below in reference to FIGS. 10 and 11. In some cases, computing node 200 may be part of or executable on computing device 1000. For instance, program instructions to perform some or all of the functionality of computing node 200 may be stored as code 1104 and/or data 1106 of memory 1102 executable by one or more processors 1100 of computing device 1000. In other cases, the components of computing node 200 may be located across multiple devices and or servers, for example described in reference to FIG. 10.

The texture component 202 may receive, obtain, or access texture information (e.g., which may also be referred to herein as graphics information), for example that is associated with a simulated space, for example as part of a video game. The simulated space may include one or more three dimensional volumes, two dimensional areas associated with three dimensional volumes (e.g., associated with separate third dimension information as described above), or other data and/or structures associated with a space to be simulated. In some cases, the simulated space may be associated with terrain, such as natural terrain, or man-made terrain such as structures or buildings. The texture information may include visual properties of the simulated space, such as color, opacity, composition, material occupying the space, etc. In some cases, the simulated space may be associated with multiple areas, which may each be associated with multiple layers having potentially different texture information. In some cases, the texture component 202 may create the association between texture information and each area or volume of simulated space. In one example, for a given area of simulated space associated with multiple layers, the texture component 202 may associate texture information to each of the layers, and then associate each layer with the area of simulated space. In other cases, the texture component 202 may receive the information already associated with an area or volume of simulated space. The texture component 202 may store the association between texture information and the area/volume of simulated space in database 206 and/or communicate some or all of the texture information to the destructibility component 204. It should be appreciated that associating and storing of texture information by the texture component 202 may be a continuous process, or may be performed upon the occurrence of an event, periodically, etc.

The destructibility component 204 may associate a destructibility value to the one or more areas of simulated space. In the multi-layer example, a destructibility value may be associated with or assigned to each layer of an area of simulated space, for example, based at least in part on one or more properties of the individual layer (e.g., layer characteristics as described above). In some cases, the destructibility value may be pre-configured for different types or compositions of the simulated space. For example, the simulated space may represent terrain, such as in a video game or other simulated video content. Layers of the terrain may be composed of different material, such as rock, water, grass, sand, free space, and so on. A destructibility value may be assigned to each layer of material, for example based on a preconfigured strength associated with each type of material or composition. This association will be described in greater detail below in reference to FIG. 5. After associating a destructibility value to each area of simulated space/each layer of each area of the simulated space, the destructibility component may store the association (e.g., the destructibility value and the area/layer of area of simulated space) in database 206.

The event detection component 208 may detect an event that affects an area of simulated space, for example that has been assigned a destructibility value by destructibility component 204. In some cases, the event detection component 208 may receive information relating to an event, for example, from one or more input devices (e.g., reacting to one or more user inputs in a video game). It should be appreciated that the event detection component 208 may operate independently of the texture component 202 and/or the destructibility component 204. In some cases, the event may be a destruction causing event, for example in a video game. The destruction causing event may be associated with an intensity, and may include an explosion, weapons fire such as missiles, grenades, bombs, and so on. The event may also be associated with a location of occurrence, for example in three dimensional space, origin, and/or a direction. The event detection component 208 may communicate the event information to the texture updating component 210.

The texture updating component 210 may then determine which area/areas or portions of the simulated space are affected by the event. In some cases, the texture updating component 210 may determine which areas are affected by the event based at least in part on the intensity of the event, origin, direction, or a combination thereof. The texture updating component 210 may access texture and destructibility information stored in the database 206 that is associated with each affected area of simulated space. Based on the destructibility value associated with each affected area, the texture updating component 210 may modify the texture information associated with each affected area. In some cases, the texture updating component 210 may also update or modify the destructibility value of one or more of the affected areas. The change in texture information and/or destructibility value for the one or more areas may be based on the intensity of the event, and in some cases, based on proximity of the area to a center of occurrence of the event, the source of the event (e.g., location or type of event), or a direction associated with the event. Techniques for updating texture information and destructibility information as a result of a destruction causing event will be described in greater detail below in reference to FIGS. 6-9.

The texture updating component 210 may then store the modified or updated texture information and/or destructibility values for the affected areas of the simulated space in the database 206. Additionally or alternatively, the texture updating component 210 may communicate the updated texture information to the rendering component 212. Upon receiving the updated texture information from the texture updating component 210 and/or accessing the updated texture information from the database 206, the rendering component 212 may then render the information into image data to be displayed to a user.

Figure 3:
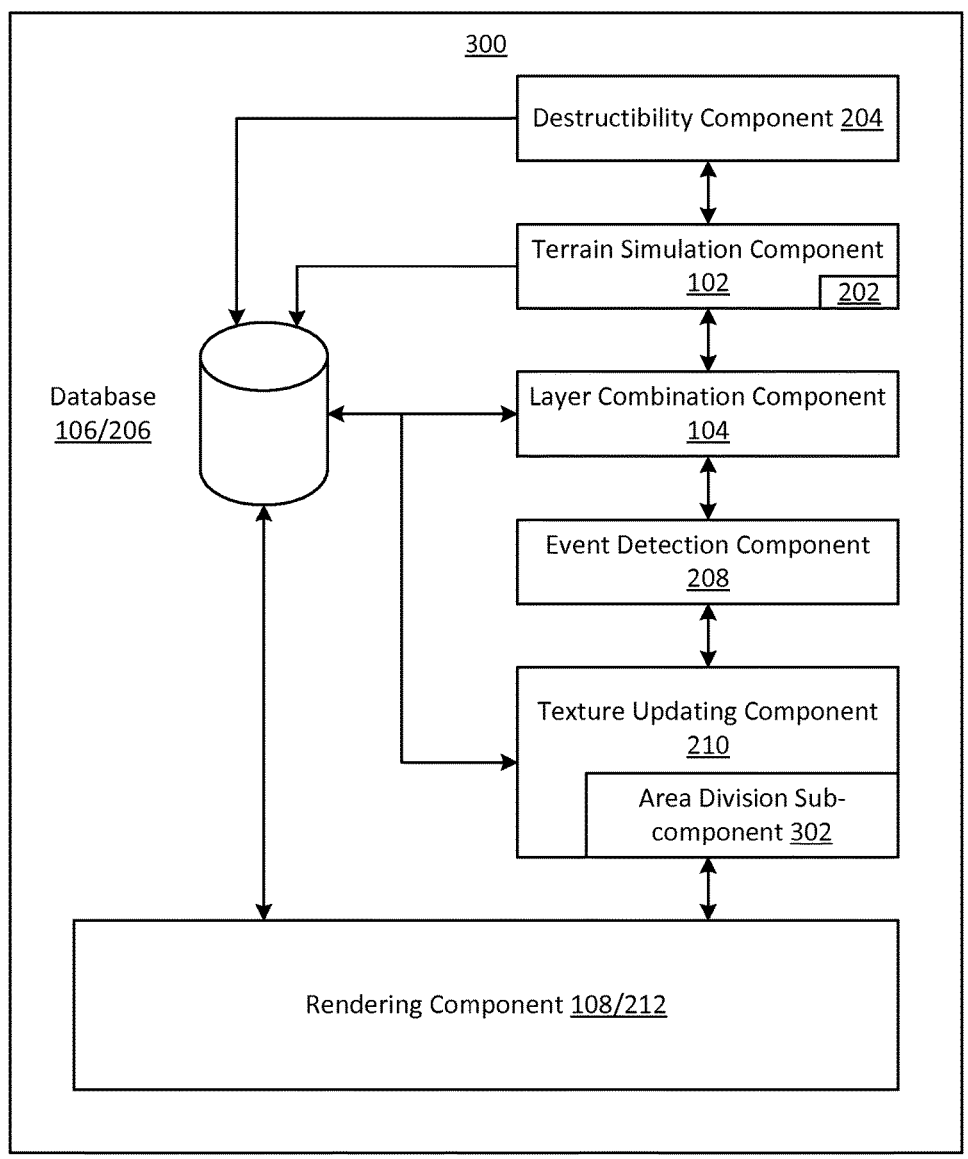
FIG. 3 is a diagram illustrating an example computing node for modeling destructible terrain having three dimensions in accordance with the present disclosure.

With reference to FIG. 3, an example of a computing node 300 configured to simulate destructible or compressible three dimensional space is shown. Example computing node 300 may include the terrain simulation component 102 and the layer combination component 104, as described in reference to computing node 100 of FIG. 1, and the destructibility component 204, the event detection component 208, and the texture updating component 210, as described in reference to computing node 200 of FIG. 2. Computing node 300 may also include database 106/206 and rendering component 108/212, which may incorporate some or all of the functionality of the databases 106 and 206 of FIGS. 1 and/or 2. The texture updating component 210 may further include an area division sub-component 302. Additionally, the terrain simulation component 102 may incorporate some or all of the functionality of texture component 202. For the sake of brevity, the similar functionality of the above components will not be described again here.

According to one example, the terrain simulation component 102 and/or the texture component 202 may receive or obtain graphic information associated with a three dimensional volume of a simulated space, such as terrain, for example, to be presented to a user in multiple scenes. The graphics information may include terrain information, for example divided into multiple three dimensional volumes or voxels. The terrain simulation component 102 and the layer combination component 104, may, in communication with database 106/206, associate the multiple voxels with multiple two dimensional areas having first and second dimensions (e.g., length and width), and associate layer/combined layer information with each two dimensional area. The terrain simulation component 102 and/or the texture component 202 may associate one or more textures/layer characteristics with each of the layers/combined layers associated with each two dimensional area. The destructibility component 204 may associate a destructibility value with each layer/each combined layer of each of the two dimensional areas. In some cases, the texture/layer characteristic information may be associated with a certain material or composition (e.g., rock, sand, soil, water, concrete, glass, free space or air, etc.). In some cases, the destructibility component 204 may access composition information stored in database 106/206 and set the destructibility value to be equal to a strength value associated with the given material of each layer. In some cases, the strength and or destructibility value for each layer may be modified by a third dimension, such as height, associated with each layer. For example, as thickness of some materials increase, so may the strength or destructibility value of a layer of that material. In other cases, the destructibility component 204 may set the strength value, for example based on a predetermined value accessed via a material database or table (not shown).

The event detection component 208 may detect the occurrence of an event, for example a destruction causing event, which affects one or more areas of the simulated space/terrain. The event detection component 208 may determine which two dimensional areas are affected by the event and indicate this information and other information associate with the event (e.g., intensity, origin, direction, etc.) to the texture updating component 210. In other scenarios, the event detection component 208 may pass all of the information to the texture updating component 210, which may then determine which areas are affected by the event.

The texture updating component 210 may determine the extent to which each area is affected and/or how many layers of each area are to be affected. Based on this information, the texture updating component 210 may modify one or more textures/layer characteristics and/or the destructibility value of each affected layer of each affect area. In some cases, the texture updating component 210 may determine if one or more layers of an affected area are going to be destroyed, necessitating removal of the surface layer so that the layer beneath the destroyed layer becomes the current surface layer (e.g., becomes visible in the rendered image). This may be determined based on an intensity of the event and the destructibility/strength of each affected layer. The texture updating component 210 may then store and/or communicate to the rendering component 108/212, the updated texture/layer characteristics for each affected layer in each affected area for rendering into image data. The texture updating component 210, may in some cases, also store the updated destructibility value for each of the remaining affected layers of each affected area in database 106/206, so that the effects of subsequent destruction events may be determined based on the updated destructibility information.

In some embodiments, the area division sub-component 302 may divide one or more two dimensional areas affected by the destruction causing event into multiple sub-areas or smaller partitions of space each associated with individual layer information. Updating texture and/or destructibility information for each of the sub-areas may be carried out, as described above. In this way, more detail of the results of the destruction causing event may be rendered into image data to ultimately enhance the user/viewer experience. In some cases, after an area has been divided by area division sub-component, layer information associated with each sub-area may be combined by the layer combination component 104, as also described above, for example to reduce processing and/or memory required to store the graphics information.

In some cases, by using the above described techniques, computing node 300 may accurately simulate destruction of three dimensional terrain, for example, including free space surrounded by other materials, such as rock, sand, grass, water, concrete, glass, etc. Using previous systems, an efficient way to simulate, for example caves in a video game, that would react and change in response to a destruction event, such as an explosion or weapons fire, was not known. By simulating three dimensional terrain by a two dimensional framework associated with separate third dimension characteristics, free space can be more efficiently simulated. By adding the destructibility component to each area/layer of each area, destruction may be more accurately and more efficiently simulated.

Figure 4A:
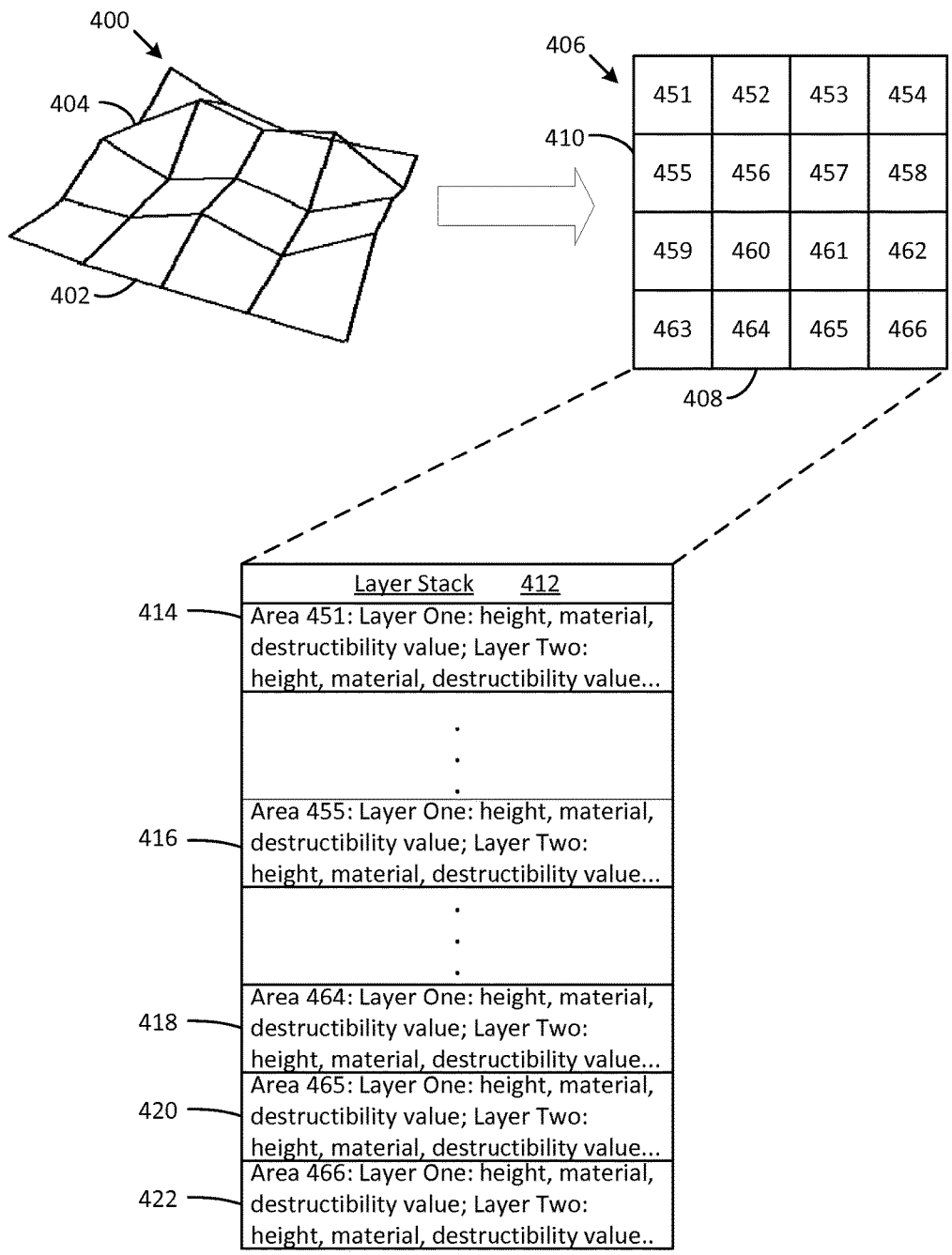
FIG. 4A is a diagram illustrating stages of simulating multiple portions of terrain in accordance with the present disclosure.

FIG. 4A shows an example three dimensional terrain map 400 and an associated two dimensional map or data structure 406 associated with a layer stack 412. Terrain map 400 may include sixteen partitions of terrain, for example, each having an associated surface profile, height, composition, etc. In one example, terrain partition 402 may be relatively flat or level, have a low relative height, such as representing a grassy field. Terrain partition 404 may be sloped, have a higher elevation or height value, and may represent a rocky mountainside or hillside. It should be appreciated that the terrain described herein is given only as examples; many other variations of terrain and partitions (e.g., including much larger terrain maps with many more terrain partitions) are contemplated herein. The terrain simulation component 102, as described above, may map one or more three dimensional volumes, for example corresponding to partitions of terrain map 400, to a two dimensional map or data structure 406 associated with third dimension characteristics, for example stored in layer stack 412.

In the example shown, each terrain partition, such as 402, 404, may correspond to a two dimensional area, such as 408, 410, which may be square or rectangular in shape. It should be appreciated that any other two dimensional areas may be associated with partitions 402, 404 of terrain map 400, for example corresponding to different terrain features, according to different coordinate systems, and so on. Layer information for each two dimensional area 408, 410 may be stored and associated in the layer stack 412. For example, each two dimensional area 451-466 may be associated with one or more layers, with each layer associated with a height value, a material, and a destructibility value, for example stored as data items 414-422 corresponding to each two dimensional area 451-466. In some cases, layer stack 412 may be stored in and accessed via database 106/206. It should be appreciated that any number of other layer characteristic's or textures may be associated with each layer and that other information or organizational structures of information may be associated with and stored with each two dimensional area.

According to the described techniques, layers have one or more similar characteristics may be combined, for example, to be represented by a single layer for one or more two dimensional areas 451-466 represented by data items 414-422 in layer stack 412. In one example, area 455, as represented by data item 416, may include fifteen layers of rock each being one meter deep or having a height of one meter, eight layers of soil each being a meter in height, and three layers of sand also each one meter in height. Each of the layers may also be associated with a destructibility value, with rock being a nine, soil being a five, and sand being a three, on a scale of one to ten. In order, for example to reduce the memory required to store the terrain information and the processing required to render image data corresponding to the terrain information, similar layers may be combined. In one example, the fifteen layers of rock may be stored as one layer, having a height of fifteen meters, having the properties of rock, and associated with a destructibility value of nine. Similarly, the eight layers of soil may be stored as one layer of soil, eight meters in height, having or associated with the properties of soil, and associated with a destructibility value of five. Similarly, the three layers of sand may be stored as one layer of sand, three meters in height, having or associated with the properties of sand, and associated with a destructibility value of three.

In another example, the layers and layer properties may be stored using run length encoding. In this example, the rock may be represented as rock, associated with the properties of rock, one meter in height, destructibility value of nine, for eight consecutive layers. Similarly the properties of soil and sand may also be stored once, followed or preceded by the number of layers having those particular properties. In this way, the size/memory required to store the terrain information associated with each area 451-466 may be reduced, and system performance may be enhanced to ultimately provide a better user experience.

Figure 4B:
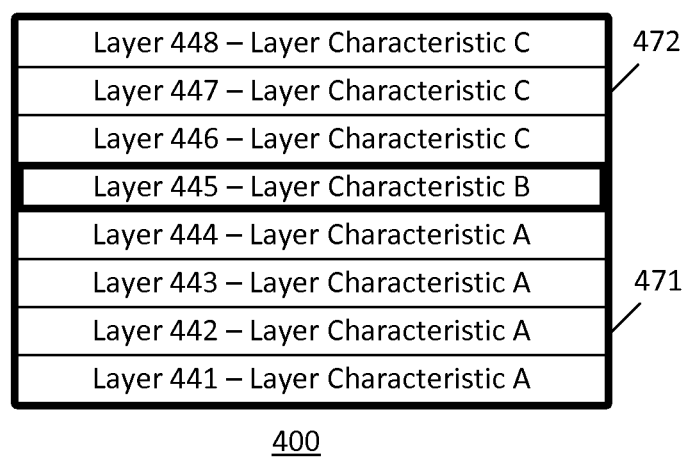
FIG. 4B is a diagram illustrating example combined layers in accordance with the present disclosure.

FIG. 4B is a diagram illustrating example combined layers in accordance with the present disclosure. In particular, as shown in FIG. 4B, layers 441-448 are associated with an area, such as any of example areas 451-466 of FIG. 4A. As also shown in FIG. 4B, layers 441-444 are each associated with layer characteristic A, layer 445 is associated with layer characteristic B, and layers 441-444 are each associated with layer characteristic C. Layer characteristics A, B, and C may correspond to layer characteristics such as different types of materials, compositions, and many others. As shown, layers 441-444 are combined into a combined layer 471 based on each of layers 441-444 being associated with layer characteristic A. Additionally, layers 446-448 are combined into a combined layer 472 based on each of layers 446-448 being associated with layer characteristic C. Layer 445 is not combined as no other of layers 441-448 are associated layer characteristic B. Combined layers 471 and 472 may be encoded and stored using, for example, run length encoding, such as by using the example techniques described in the preceding paragraph to, for example, reduce storage requirements for information associated with an area.

Run length encoding, as generally understood in the art, is a form of data compression in which runs of data (i.e., sequences in which the same data value occurs in many consecutive data elements) may be stored as a single data value and count, rather than as the original run. Run length encoding may sometimes be highly advantageous when used on data that includes many such runs.

Figure 5:
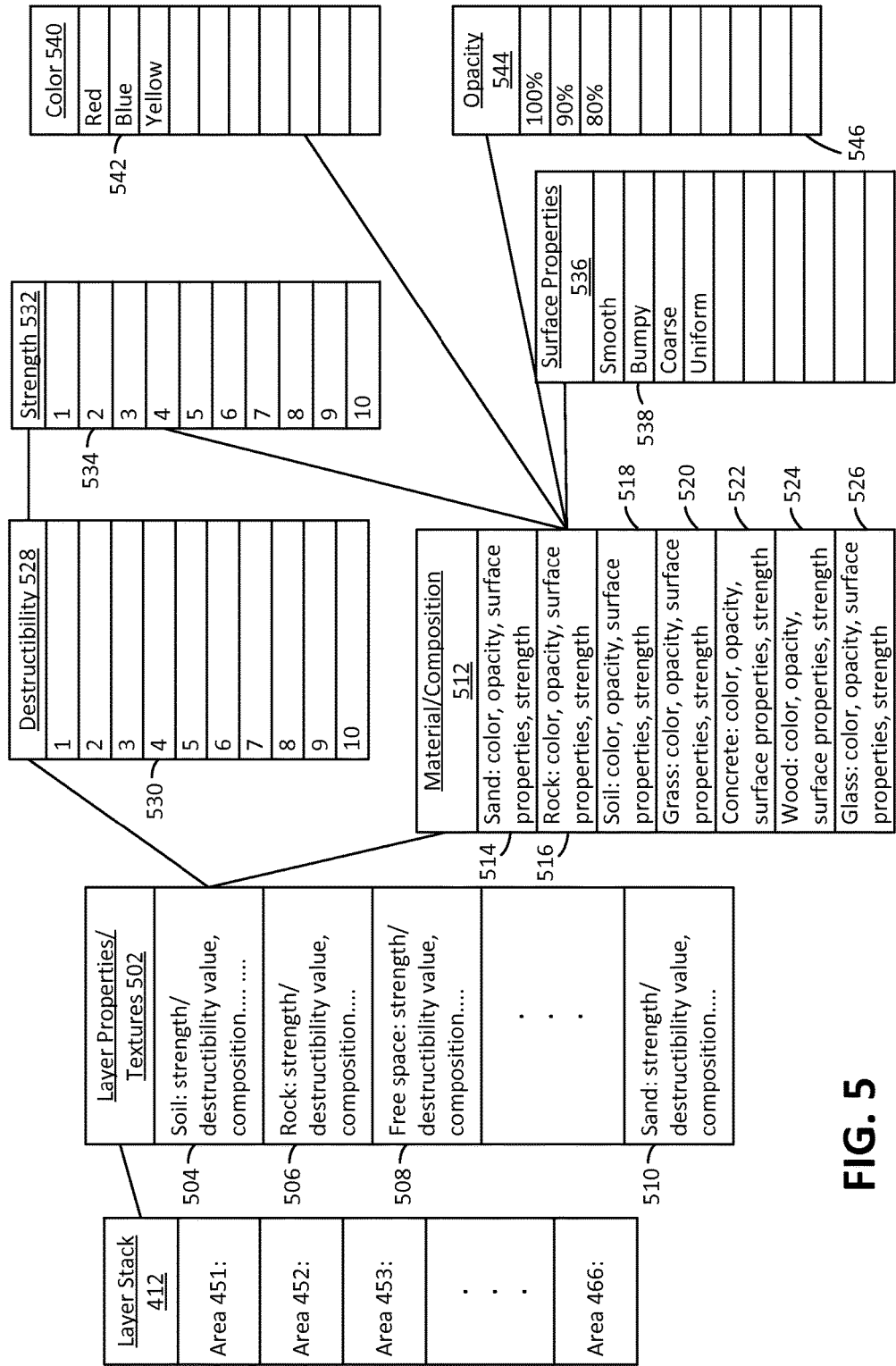
FIG. 5 is a diagram illustrating example databases for storing and associating various properties/textures with layers of areas of terrain in accordance with the present disclosure.

FIG. 5 shows an example of a database and related data structures representing layer information in accordance with the described embodiments. The illustrated data structures may be written to, stored in, and/or accessed via database 106/206 described above. In one example, the layer stack 412 of FIG. 4A may be associated with or link to various other data stores, for example a layer properties/textures table 502, a material/composition table 512, a destructibility table 528, a strength table 532, a surface properties table 536, a color table 540, and an opacity table 544, either directly or indirectly. It should be appreciated that other layer characteristics or textures may be associated with one or more layers and in different manners; the following description is only given as an example.

In some cases, the layer stack 412 may link to the layer properties/textures table 502, which may store items associated with different types of terrain, including soil 504, rock, 506, free space, 508, concrete (not shown), glass (not shown), drywall or sheetrock (not shown), sand 510, and so on. Each item 504, 506, 508, 510 may further link to associated destructibility values 530 stored in the destructibility table 528 and a material/composition table 512. In one example, the destructibility values 530 for a given layer may range from one to ten, with ten being the strongest or most resilient to destruction. In some embodiments, the destructibility value 530 stored in destructibility table 528 may represent the real-time destructibility value of the given layer of two dimensional area, for example that may be updated upon occurrence of an event, such as a destructibility event. Each material/composition 514-526 in the material/composition table 512 associated with a layer may be linked to a strength value 534 stored in the strength table 532, for example ranging similarly from one to ten. Upon creation or simulation of the particular two dimensional area/layer associated with the two dimensional area of terrain, the destructibility value 530 for each material may be selected according to predetermine strength values 534 (e.g., rock having a higher value than water or sand). The material table 512 may include multiple items, such as sand 514, rock 516, soil 518, grass 520, concrete 522, wood 524, glass 526, and so on, each associated with a number of properties of the given material, such as strength via strength table 532, surface properties via surface properties table 536, color via color table 540, and opacity via opacity table 544.

The surface properties table 536 may include various surface properties 538 such as smooth, bumpy, coarse, solid, uniform, etc., and may inform the color selection for the particular layer, via color table 540. Color table 540 may contain any number of colors 542, depending on memory, types of terrain, resolution of the computing system, resolution of one or more GPUs, etc., and or may include qualities of the color. The opacity table 544 may also inform the color 542 associated with a layer, for example based on the colors of surrounding or adjacent layers in the example of water or free space, and may include any division of values, for example as a percentage 546. Other structures, associations, and properties may be associated with a particular layer to yield similar results.

Figure 6:
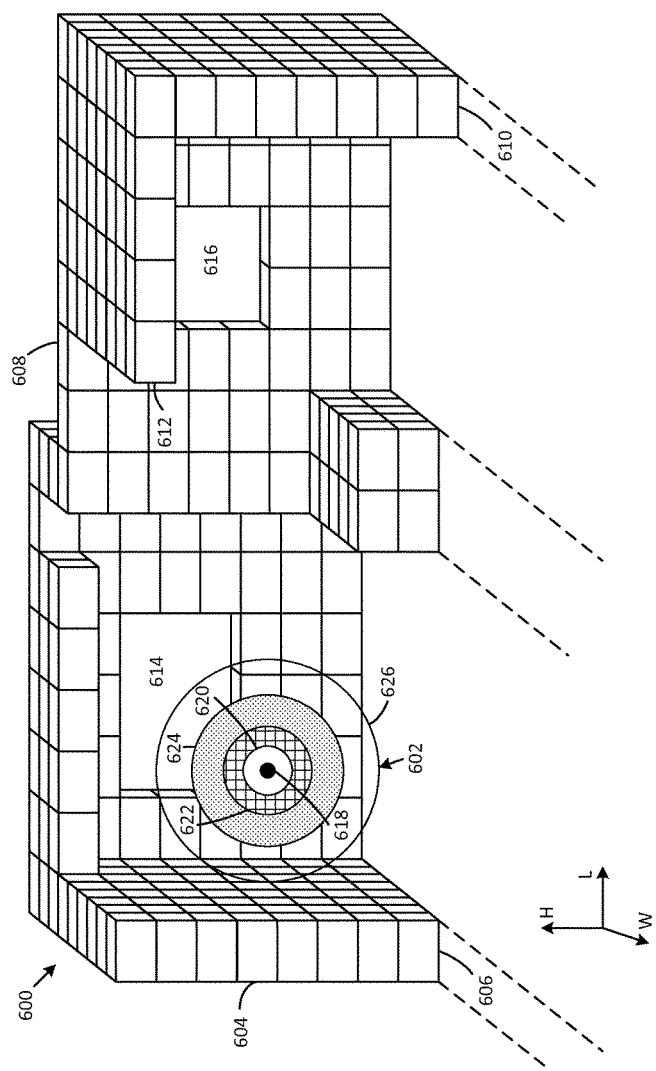
FIGS. 6 and 7 are three dimensional diagrams illustrating the occurrence and result of a destruction event in a building in accordance with the present disclosure.
Figure 7:
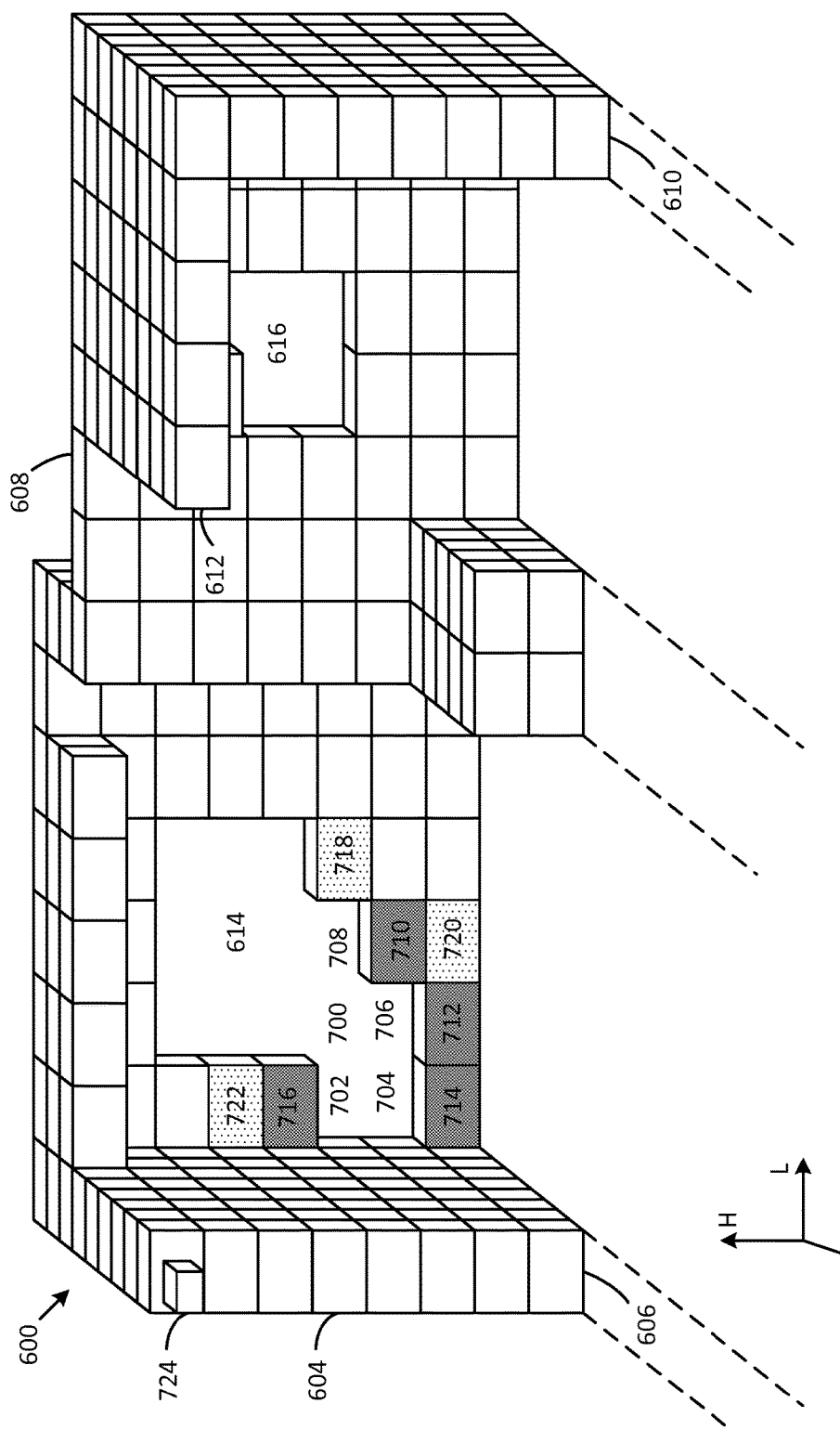

FIGS. 6 and 7 are three dimensional diagrams illustrating the occurrence and results of a destruction event 602 in a simulated building 600 in accordance with the present disclosure. The building or structure 600 is represented by a number of blocks 604, which may also be referred to as three dimensional volumes or voxels, forming a left wall 606, a back wall 608, a right wall 610, and a ceiling 612. For the sake of explanation, the left and right walls 606, 610 and the ceiling 612 are cutout so as to show an interior portion of the building 600. The back wall 608 may include two open spaces, such as windows 614, 616. Window 614 may be three blocks by three blocks in size, while window 616 may be three blocks tall and two blocks wide. Each block 604 may be associated with concrete, for example, may have a certain destructibility value of eight, and may have certain textures or properties representative of a concrete block, such as grey color, no opacity, relatively smooth surface, and may have certain dimensions, such as a length, width, and height.

In one example, every block 604, for example in the left wall 606, in the H direction may be represented by a layer of a certain height, e.g., associated with a two dimensional area having a length value and a width value also corresponding to one block 604. A two dimensional area having a length and width, for example corresponding to a block of ceiling 612, may be associated with multiple layers including one layer of concrete, and seven layers of free space, for example. In this way, the building 600 may be stored or represented as multiple associations between each two dimensional area in the WL plane and multiple layers in the H plane.

The occurrence of destruction event 602, for example, may affect multiple areas of the building (e.g., a type of man-made terrain), including multiple blocks 604. In one example, destruction event 602 may be represented by a center 618 of a highest intensity value, with zones 620, 622, 624, 626 (e.g., areas or volumes) emanating outward from the center 618 representing decreasing intensity levels. The affect to each block 604 by destruction event 602 may be determined, for example, based on the intensity level associated with the corresponding block 604. In one example, the destruction event may be associated with the explosion of a grenade, the impact of a missile, etc.

As illustrated in FIG. 7, the blocks 700-708, associated with the center 618 and the first two zones 620 and 622 of the destruction event 602 (e.g., zones of highest intensity) may be removed as a result of the destruction event 602, for example, destroyed. In the example shown, blocks 700-708 are replaced by free space having an opacity of 100% (or possibly less immediately after the occurrence of the destruction event 602 representing smoke from an explosion), associated with the color of surrounding blocks, having a destructibility value of 0, and so on. In other examples, destruction event 602 may change or destroy enough blocks 604 to shift bigger portions of the simulated space or terrain, for example including partial or full caving in of ceiling 612. In this way, free space may be more accurately and dynamically simulated to enhance the user experience of destructible terrain features.

Returning to the illustrated example, surrounding blocks 710-716 may experience changes in texture and other properties as a result of the destruction event 602 (e.g., corresponding to less intensity associated with zone 624), for example represented by charring or partial destruction of the surface of each of blocks 710-716. Blocks 718-722 may experience an even less degree of change in one or more textures as a result of the destruction event (e.g., corresponding to the least intense zone 626 of the destruction event 602), which may be represented by only slight charring and no noticeable change to the surface of blocks 718-722.

In other example, one or more of walls 606, 608, or 610, or ceiling 612 may be made of multiple materials, such that each block or two dimensional area associated with multiple layers is represented by a multiple of smaller blocks 724 or more two dimensional areas/layers. In other cases, each block or two dimensional area associated with multiple layers may be represented by blocks 604 having average characteristics of each material in block 604, for example representing sheetrock, wood framing, nails, insulation, etc. In this scenario, the textures of each block 604 may be averaged or kept separate, so as to add detail to the rendered image data. In some cases, for each block 604, or for multiple blocks, destructibility values may be averaged to simplify the destruction calculations, e.g., by associating an average destructibility value to multiple blocks 604.

Figure 8:
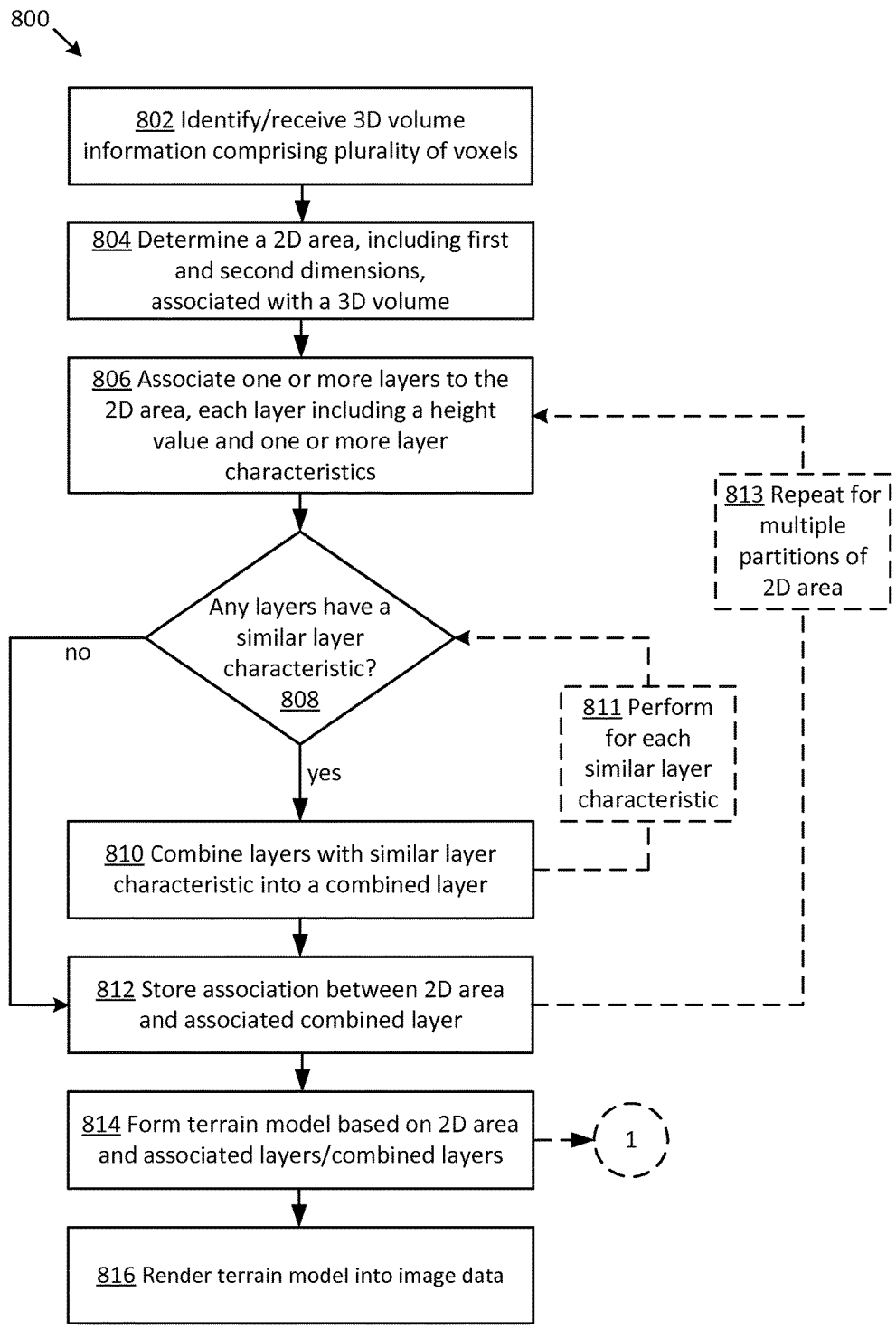
FIGS. 8 and 9 are flowcharts depicting example processes for modeling destructible three dimensional terrain that may be used in accordance with the disclosed techniques.

FIG. 8 shows an example process 800 for simulating three dimensional terrain, in accordance with the techniques described herein. In some cases, and as will be described below, process 800 may be combined with process 900 of FIG. 9 to simulate destruction in the three dimensional terrain. Process 800 may be performed, for example, by computing node 100 of FIG. 1. Similarly, process 900 may be performed, for example, by computing 200 of FIG. 2, whereas the combination of processes 800 and 900 may be performed by computing node 300 of FIG. 3.

Process 800 may begin, for example, by identifying and/or receiving three-dimensional volume information including a plurality of voxels, at operation 802. In some cases, this information may be associated with and/or retrieved from a content item, such as a video game or other simulation. One or more two dimensional areas, such as areas 451-466 of FIG. 4A, each including first and second dimensions (e.g., length and width), corresponding to one or more voxels, may be determined at operation 804. One or more layers may subsequently be associated with each two dimensional area, with each layer including a height and one or more layer characteristics or textures at operation 806, for example as described in reference to FIGS. 4 and 5 above.

Next, it may be determined if any layers of a particular two dimensional area have one or more similar layer characteristics (e.g., are associated with the same composition or material) at operation 808. If multiple layers are determined to have a similar layer characteristic, the multiple layers may be combined into a combined layer at operation 810. The layers having a similar layer characteristic may be combined, for example using run length encoding, by creating a combined layer having the layer characteristics of the individual layers and a combined height value, as described above, or by other means. Operations 808 and 810, e.g., implemented by layer combination component 104, may be performed for each similar layer characteristic/for multiple different subsets of similar layers, at operation 811. The association between the combined layer(s) and the two dimensional area may then be stored or created at operation 812.

If it is determined, at operation 808, that there are no layers, associated with a particular two dimensional area, having a similar layer characteristic, then the layer information and/or combined layer information associated with the particular two dimensional area may similarly be stored at operation 812. Operations 806, 808, 810, 811, and 812 may be repeated for each two dimensional area at operation 813.

Once all of the two dimensional areas corresponding to the received three dimensional volume information have been associated with layer information, those associations may be used to form a terrain model at operation 814. The terrain model may then be rendered into image data at operation 816, for example by the rendering component 108 and presented to a user. The terrain model may be rendered using, for example, a voxel-based mesh generation technique.

Figure 9:
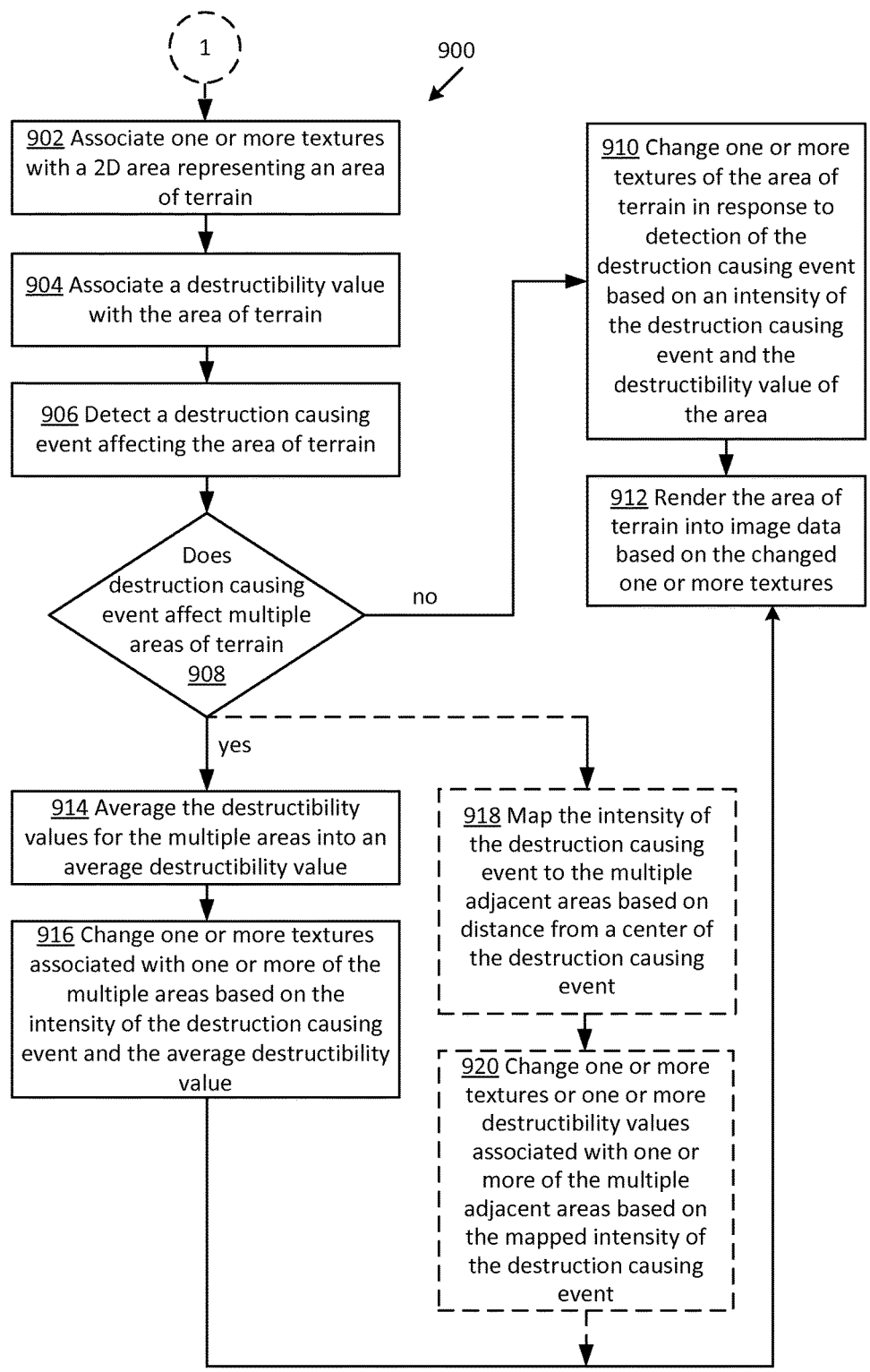

In some cases, process 800 may link to process 900 of FIG. 9, for example, after operation 814 is performed. It should be appreciated that processes 800 and 900 may be performed contemporaneously, simultaneously, or may be linked at one or more operations other than operation 814.

With reference to FIG. 9, process 900 for simulating destruction of terrain is illustrated. Process 900 may begin, for example, by associating one or more textures (e.g., layer characteristics), with a two dimensional area representing an area of terrain at operation 902. In some cases, the two dimensional area may correspond to a two dimensional area that has been generated from a three dimensional volume, for example, by process 800. A destructibility value may be associated with the area of terrain at 904, for example as described in greater detail above. In some cases, each area of terrain may be associated with a plurality of layers. In this scenario, each layer may be associated with a destructibility value, which may represent a strength and/or previous destruction of the two dimensional area.

A destruction causing event may be detected at operation 906, including, for example, weapons fire, or other terrain affecting event. It may then be determined if the destruction causing event affects multiple areas of terrain at operation 908. If the destruction causing event only affects a single area of terrain, then process 900 may proceed to operation 910, where one or more textures of the area of terrain may be changed based on an intensity of the destruction causing event and the destructibility value of the area. In some cases, the destructibility value of the affected area of terrain may also be changed based on a similar determination (not shown). The changed/updated area of terrain may then be rendered into image data at operation 912, for example by rendering component 212.

If the destruction causing event is found to affect multiple areas of terrain at operation 908, then process 900 may proceed to operation 914, where the destructibility values for the multiple areas of affected terrain may be averaged into an average destructibility value. Next, one or more textures of the affected areas may be changed based on the intensity of the destruction causing event and the average destructibility value of the affected terrain areas at operation 916. The updated textures may then be rendered into image data and presented to a user at operation 912. In some cases, the destructibility value of the affected areas of terrain may also be changed based on a similar determination (not shown).

In another embodiment of process 900, if the destruction causing event is found to affect multiple areas of terrain at operation 908, then process 900 may proceed to operation 918, where the intensity of the destruction causing event may be mapped to multiple adjacent areas of terrain based on a distance from a center of the destruction causing event. Next, one or more textures and/or one or more destructibility values associated with one or more of the multiple adjacent areas may be changed based on the mapped intensity of the destruction causing event at operation 920, as described above in greater detail in reference to FIG. 7. The updated textures may then be rendered into image data and presented to a user at operation 912.

An example computing environment that may be used to model/simulate three dimensional graphic information will now be described in detail. In particular, FIG. 10 illustrates an example computing environment in which the embodiments described herein may be implemented. FIG. 10 is a diagram schematically illustrating an example of a data center 1004 that can provide computing resources to users or viewers 1002*a* and 1002*b* (which may be referred herein singularly as user 1002 or in the plural as users 1002) via user computers 1000*a* and 1000*b* (which may be referred herein singularly as computer 1000 or in the plural as computers 1000) via a communications network 1008. Data center 1004 may be configured to provide computing resources for executing applications on a permanent or an as-needed basis. The computing resources provided by data center 1004 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resources may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 1004 may include servers 1010*a-b* (which may be referred herein singularly as server 1010 or in the plural as servers 1010) that provide computing resources. These resources may be available as bare metal resources, or as virtual machine instances 1012*a-d* and (which may be referred herein singularly as virtual machine instance 1012 or in the plural as virtual machine instances 1012). Virtual machine instances 1012*c* and 1012*d* are three dimensional graphic simulation virtual machine ("TDGSVM") instances. The TDGSVM virtual machine instances 1012*c* and 1012*d* may be configured to perform all or any portion of the techniques for combing multiple audio sources associated with multiple spatial locations in accordance with the present disclosure and described in detail below. As should be appreciated, while the particular example illustrated in FIG. 10 includes one TDGSVM virtual machine in each server, this is merely an example. A server may include more than one TDGSVM virtual machine or may not include any TDGSVM virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Figure 10:
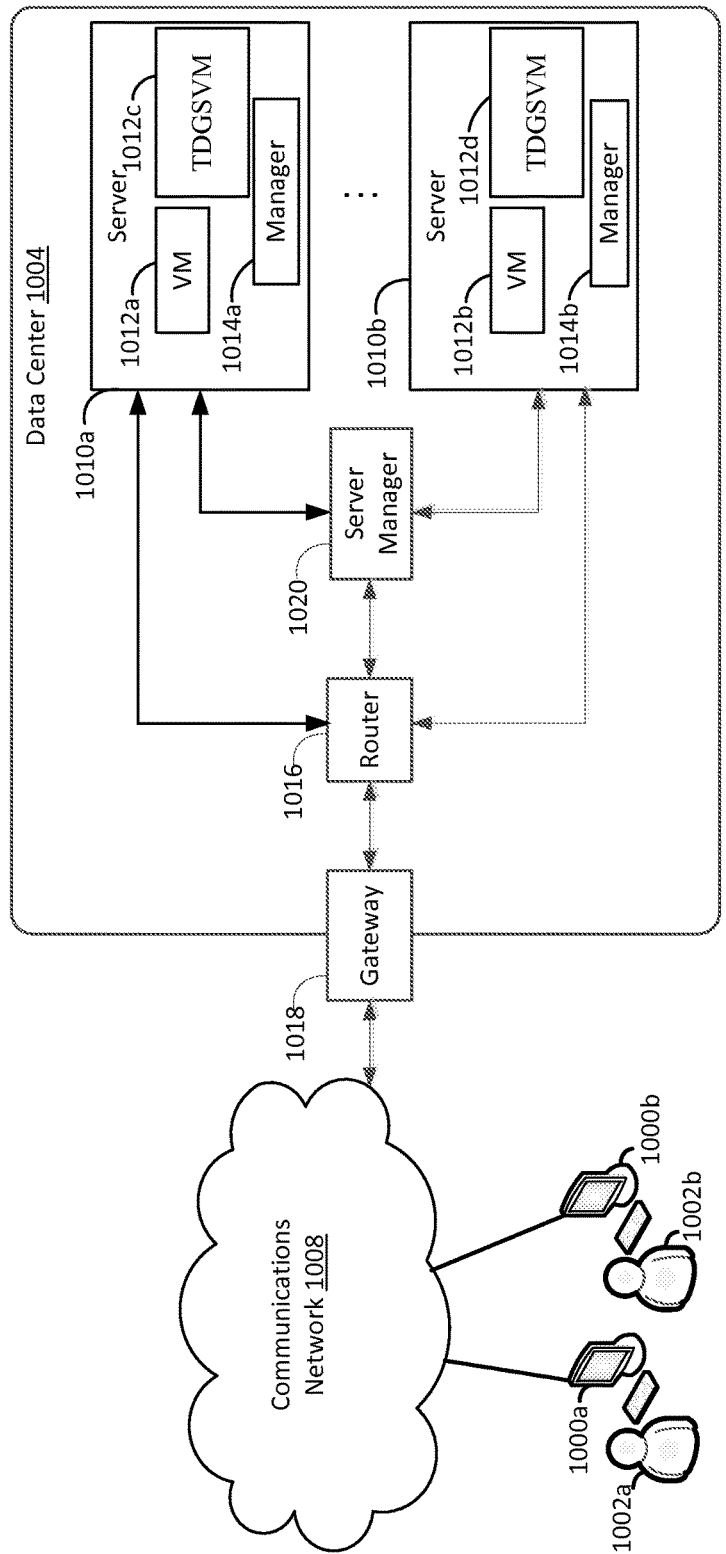
FIG. 10 is a diagram illustrating an example computing system that may be used in some embodiments.
Figure 11:
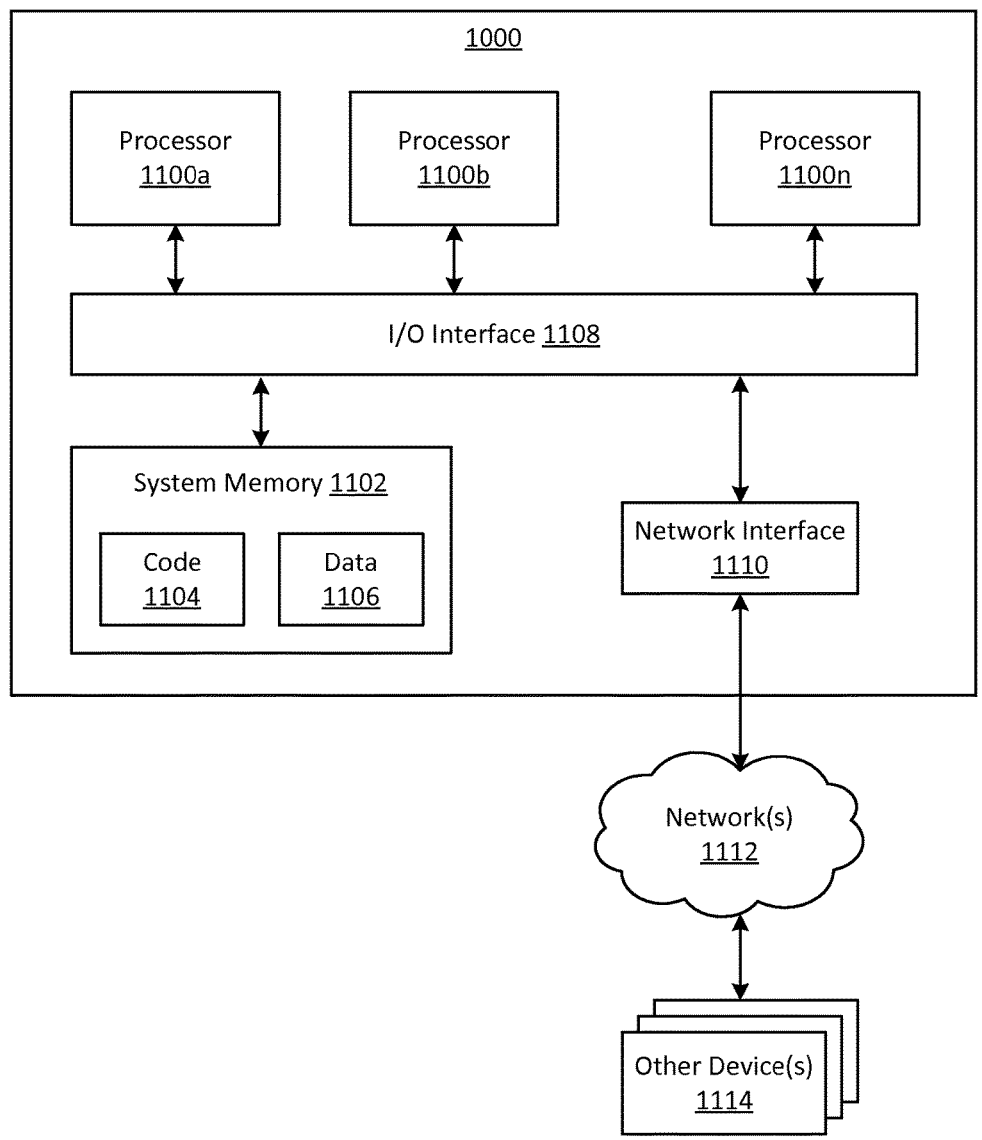
FIG. 11 is a diagram illustrating another example computing system that may be used in some embodiments.

Referring to FIG. 10, communications network 1008 may, for example, be a publicly accessible network of linked networks and possibly operated by various distinct parties, such as the Internet. In other embodiments, communications network 1008 may be a private network, such as a corporate or university network that is wholly or partially inaccessible to non-privileged users. In still other embodiments, communications network 1008 may include one or more private networks with access to and/or from the Internet.

Communication network 1008 may provide access to computers 1000. User computers 1000 may be computers utilized by users 1002 or other customers of data center 1004. For instance, user computer 1000*a* or 1000*b* may be a server, a desktop or laptop personal computer, a tablet computer, a wireless telephone, a personal digital assistant (PDA), an e-book reader, a game console, a set-top box or any other computing device capable of accessing data center 1004. User computer 1000*a* or 1000*b* may connect directly to the Internet (e.g., via a cable modem or a Digital Subscriber Line (DSL)). Although only two user computers 1000*a* and 1000*b* are depicted, it should be appreciated that there may be multiple user computers.

User computers 1000 may also be utilized to configure aspects of the computing resources provided by data center 1004. In this regard, data center 1004 might provide a gateway or web interface through which aspects of its operation may be configured through the use of a web browser application program executing on user computer 1000. Alternatively, a stand-alone application program executing on user computer 1000 might access an application programming interface (API) exposed by data center 1004 for performing the configuration operations. Other mechanisms for configuring the operation of various web services available at data center 1004 might also be utilized.

Servers 1010 shown in FIG. 10 may be standard servers configured appropriately for providing the computing resources described above and may provide computing resources for executing one or more web services and/or applications. In one embodiment, the computing resources may be virtual machine instances 1012. In the example of virtual machine instances, each of the servers 1010 may be configured to execute an instance manager 1014a-b (which may be referred herein singularly as instance manager 1014 or in the plural as instance managers 1014) capable of executing the virtual machine instances 1012. The instance managers 1014 may be a virtual machine monitor (VMM) or another type of program configured to enable the execution of virtual machine instances 1012 on server 1010, for example. As discussed above, each of the virtual machine instances 1012 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 1004 shown in FIG. 10, a router 1016 may be utilized to interconnect the servers 1010a and 1010b. Router 1016 may also be connected to gateway 1018, which is connected to communications network 1008. Router 1016 may be connected to one or more load balancers, and alone or in combination may manage communications within networks in data center 1004, for example by forwarding packets or other data communications as appropriate based, at least in part, on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 1004 shown in FIG. 10, a server manager 1020 is also employed to at least in part direct various communications to, from, and/or between servers 1010a and 1010b. While FIG. 10 depicts router 1016 positioned between gateway 1018 and server manager 1020, this is merely an exemplary configuration. In some cases, for example, server manager 1020 may be positioned between gateway 1018 and router 1016. Server manager 1020 may, in some cases, examine portions of incoming communications from user computers 1000 to determine one or more appropriate servers 1010 to receive and/or process the incoming communications. Server manager 1020 may determine appropriate servers to receive and/or process the incoming communications based, at least in part, on factors such as an identity, location or other attributes associated with user computers 1000, a nature of a task with which the communications are associated, a priority of a task with which the communications are associated, a duration of a task with which the communications are associated, a size and/or estimated resource usage of a task with which the communications are associated and many other factors. Server manager 1020 may, for example, collect or otherwise have access to state information and other information associated with various tasks in order to, for example, assist in managing communications and other operations associated with such tasks.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 1004 described in FIG. 10 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, gaming devices or consoles, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules or components may in some embodiments be combined in fewer modules or components or distributed in additional modules or components. Similarly, in some embodiments the functionality of some of the illustrated modules or components may not be provided and/or other additional functionality may be available.

In at least some embodiments, the techniques described herein for three dimensional graphics simulation may be implemented on one or more computing devices 1000, one or more computing devices 1000 and one or more servers 1010 associated with data center 1004 via communications network 1008, other devices (not shown), or combinations thereof. FIG. 11 depicts an example of a computer system including a computing device 1000 in communication with other devices 1114 that is configured to simulate three dimensional graphics in accordance with various embodiments described herein. In the illustrated embodiment, computing device 1000 includes one or more processors 1100a, 1100b through 1100n (which may be referred herein singularly as "a processor 1100" or in the plural as "the processors 1100") coupled to a system memory 1102 via an input/output (I/O) interface 1108. Computing device 1000 further includes a network interface 1110 coupled to the I/O interface 1108, by which computing device 1000 may communicate with other devices 1114.

In various embodiments, computing device 1000 may be a uniprocessor system including one processor 1100 or a multiprocessor system including several processors 1100 (e.g., two, four, eight or another suitable number). Processors 1100 may be any suitable processors capable of executing instructions. For example, in various embodiments, processors 1100 may be general-purpose or embedded processors implementing any of a variety of instruction set architectures (ISAs), such as the x86, PowerPC, SPARC or MIPS ISAs or any other suitable ISA. In multiprocessor systems, each of processors 1100 may commonly, but not necessarily, implement the same ISA.

System memory 1102 may be configured to store instructions and data accessible by processor(s) 1100. In various embodiments, system memory 1102 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 1102 as code 1104 and data 1106.

In one embodiment, I/O interface 1108 may be configured to coordinate I/O traffic between processor 1100, system memory 1102 and any peripherals in the device, including network interface 1110 or other peripheral interfaces. In some embodiments, I/O interface 1108 may perform any necessary protocol, timing or other data transformations to convert data signals from one component (e.g., system memory 1102) into a format suitable for use by another component (e.g., processor 1100). In some embodiments, I/O interface 1108 may include support for devices attached through various types of peripheral buses, such as a variant of the Peripheral Component Interconnect (PCI) bus standard or the Universal Serial Bus (USB) standard, for example. In some embodiments, the function of I/O interface 1108 may be split into two or more separate components, such as a north bridge and a south bridge, for example. Also, in some embodiments some or all of the functionality of I/O interface 1108, such as an interface to system memory 1102, may be incorporated directly into processor 1100. In some cases, the I/O interface 1108 may include support for multiple input devices including gaming devices, controllers, keyboards, and the like, and presentation devices including speakers, display devices, etc.

Network interface 1110 may be configured to allow data to be exchanged between computing device 1000 and other device or devices 1114 attached to a network or networks 1112, such as other computer systems or devices, for example. In various embodiments, network interface 1110 may support communication via any suitable wired or wireless general data networks, such as types of Ethernet networks, for example. Additionally, network interface 1110 may support communication via telecommunications/telephony networks such as analog voice networks or digital fiber communications networks, via storage area networks ("SANs") such as Fibre Channel SANs or via any other suitable type of network and/or protocol.

In some embodiments, system memory 1102 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1000 via I/O interface 1108. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 1000 as system memory 1102 or another type of memory. Further, a computer-accessible medium may include transmission media or signals such as electrical, electromagnetic or digital signals conveyed via a communication medium such as a network and/or a wireless link, such as those that may be implemented via network interface 1110. Portions or all of the computing device 1000 and/or portions or all of other devices 1114 illustrated in FIG. 11 may be used to implement the described functionality in various embodiments; for example, software components running on a variety of different devices and servers may collaborate to provide the functionality. In some embodiments, portions of the described functionality may be implemented using storage devices, network devices or special-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OSs) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for simulating destruction in a video game comprising:
    at least one memory;
    one or more processors in communication with the at least one memory;
    one or more texture components operable to:
        associate one or more textures with an area of terrain, the area of terrain associated with a plurality of layers, wherein at least one subset of the plurality of layers having at least one similar layer characteristic is combined into a combined layer;
    one or more destructibility components operable to:
        associate a destructibility value with the area of terrain;
    one or more event detection components operable to:
        detect a destruction causing event affecting the area of terrain;
    one or more texture updating components operable to:
        perform changing of at least one of the one or more textures in response to detection of the destruction causing event, wherein the changing is based, at least in part, on an intensity of the destruction causing event and the destructibility value of the area of terrain; and
    one or more rendering components operable to:
        render the area of terrain into image data based, at least in part, on the changed at least one of the one or more textures.

2. The system of claim 1, wherein the one or more texture updating components are further operable to:
    update the destructibility value based at least in part on the destruction causing event and the intensity of the destruction causing event.

3. The system of claim 1, wherein the destruction causing event affects multiple areas; and wherein the one or more texture updating components are further operable to:
    average the destructibility values for the multiple areas into an average destructibility value; and
    change one or more textures associated with one or more of the multiple areas based at least in part on the intensity of the destruction causing event and the average destructibility value.

4. The system of claim 1, wherein the area of terrain comprises multiple adjacent areas, and wherein the intensity of the destruction causing event for the each of the multiple adjacent areas is based, at least in part, on a function of distance from each of the multiple adjacent areas to a center of the destruction causing event.

5. A method for simulating destruction comprising:
    associating one or more textures with an area of a simulated space, the area of the simulated space associated with a plurality of layers, wherein at least one subset of the plurality of layers having at least one similar layer characteristic is combined into a combined layer;
    associating a destructibility value with the area of the simulated space; and
    changing at least one of the one or more textures in response to a destruction causing event, wherein the changing is based, at least in part, on an intensity of the destruction causing event and the destructibility value of the area of the simulated space.

6. The method of claim 5, further comprising:
    updating the destructibility value based, at least in part, on the destruction causing event.

7. The method of claim 6, wherein the destructibility value is updated based, at least in part, on the intensity of the destruction causing event.

8. The method of claim 5, further comprising:
    dividing the area into multiple sub-areas in response to the destruction causing event, wherein at least one of the sub-areas is associated with at least one of a different texture or a different destructibility value.

9. The method of claim 5, wherein the intensity of the destruction causing event is determined based, at least in part, on at least one of a proximity of the area to the destruction causing event, a source of the destruction causing event, or a direction associated with the destruction causing event.

10. The method of claim 5, wherein the destruction causing event affects multiple areas; and wherein the changing further comprises:
    averaging destructibility values for the multiple areas into an average destructibility value; and
    changing one or more textures associated with one or more of the multiple areas based at least in part on the intensity of the destruction causing event and the average destructibility value.

11. The method of claim 5, wherein the area of the simulated space comprises multiple adjacent areas, and wherein the intensity of the destruction causing event for the each of the multiple adjacent areas is based, at least in part, on a function of distance from each of the multiple adjacent areas to a center of the destruction causing event.

12. The method of claim 5, wherein the area comprises terrain.

13. The method of claim 5, wherein the destruction causing event is an explosion.

14. One or more non-transitory computer-readable storage media having stored thereon instructions that, upon execution on at least one compute node, cause the at least one compute node to perform operations comprising:
    associating one or more textures with an area of a simulated space, the area of the simulated space associated with a plurality of layers, wherein at least one subset of the plurality of layers having at least one similar layer characteristic is combined into a combined layer;

associating a destructibility value with the area of the simulated space; and changing at least one of the one or more textures in response to a destruction causing event, wherein the changing is based, at least in part, on an intensity of the destruction causing event and the destructibility value of the area of the simulated space.

15. The one or more non-transitory computer-readable storage media of claim 14, wherein the operations further comprise:

updating the destructibility value based at least in part on the destruction causing event.

16. The one or more non-transitory computer-readable storage media of claim 15, wherein the destructibility value is updated based, at least in part, on the intensity of the destruction causing event.

17. The one or more non-transitory computer-readable storage media of claim 14, wherein the operations further comprise:

dividing the area into multiple sub-areas in response to the destruction causing event, wherein at least one of the sub-areas is associated with at least one of a different texture or a different destructibility value.

18. The one or more non-transitory computer-readable storage media of claim 14, wherein the intensity of the destruction causing event is determined based, at least in part, on at least one of a proximity of the area to the destruction causing event, a source of the destruction causing event, or a direction associated with the destruction causing event.

19. The one or more non-transitory computer-readable storage media of claim 14, wherein the destruction causing event affects multiple areas; and wherein the operations further comprise:

averaging destructibility values for the multiple areas into an average destructibility value; and changing one or more textures associated with one or more of the multiple areas based at least in part on the intensity of the destruction causing event and the average destructibility value.

20. The one or more non-transitory computer-readable storage media of claim 14, wherein the area of the simulated space comprises multiple adjacent areas, and wherein the intensity of the destruction causing event for the each of the multiple adjacent areas is based, at least in part, on a function of distance from each of the multiple adjacent areas to a center of the destruction causing event.

* * * * *